(12) United States Patent
Armbruster

(10) Patent No.: US 8,480,400 B1
(45) Date of Patent: Jul. 9, 2013

(54) DEVICE FOR TEACHING READING SKILLS

(76) Inventor: Shirley Armbruster, Amarillo, TX (US)

( * ) Notice: Subject to any disclaimer, the term of this patent is extended or adjusted under 35 U.S.C. 154(b) by 291 days.

(21) Appl. No.: 12/584,000

(22) Filed: Aug. 31, 2009

(51) Int. Cl.
*G09B 17/02* (2006.01)

(52) U.S. Cl.
USPC .......................................... 434/181; 434/178

(58) Field of Classification Search
USPC ............ 434/176, 178–183, 199, 405; 40/352, 40/488; 235/89 R
See application file for complete search history.

(56) References Cited

U.S. PATENT DOCUMENTS

| | | | | |
|---|---|---|---|---|
| 140,135 A | * | 6/1873 | Hildreth | 434/178 |
| 1,521,491 A | * | 12/1924 | Walker | 434/405 |
| 3,200,514 A | * | 8/1965 | Kopel | 434/348 |
| 3,477,146 A | * | 11/1969 | Warneke | 434/405 |
| 4,016,659 A | * | 4/1977 | Merrigan | 434/181 |
| 4,055,908 A | * | 11/1977 | Greene et al. | 434/178 |
| 4,770,635 A | * | 9/1988 | Gabay | 434/178 |
| 5,950,560 A | * | 9/1999 | Block et al. | 116/240 |
| 6,832,915 B1 | * | 12/2004 | Kirby | 434/178 |
| 7,056,122 B2 | * | 6/2006 | Lockett | 434/181 |
| 7,954,444 B2 | * | 6/2011 | Smith | 116/240 |

* cited by examiner

*Primary Examiner* — Kurt Fernstrom
(74) *Attorney, Agent, or Firm* — Norman B. Rainer

(57) ABSTRACT

A device for teaching reading skills employs a frame of rectangular configuration having an open interior region bounded in part by spaced apart parallel struts having paired grooves which function as upper and lower tracks. A window panel having an elongated aperture with a height that embraces one to three lines of printed text removably slides into the interior region upon one set of tracks. An obscuring panel slidably enters the other set of tracks and enables controllable visualization of a few words per line of exposed text.

5 Claims, 3 Drawing Sheets

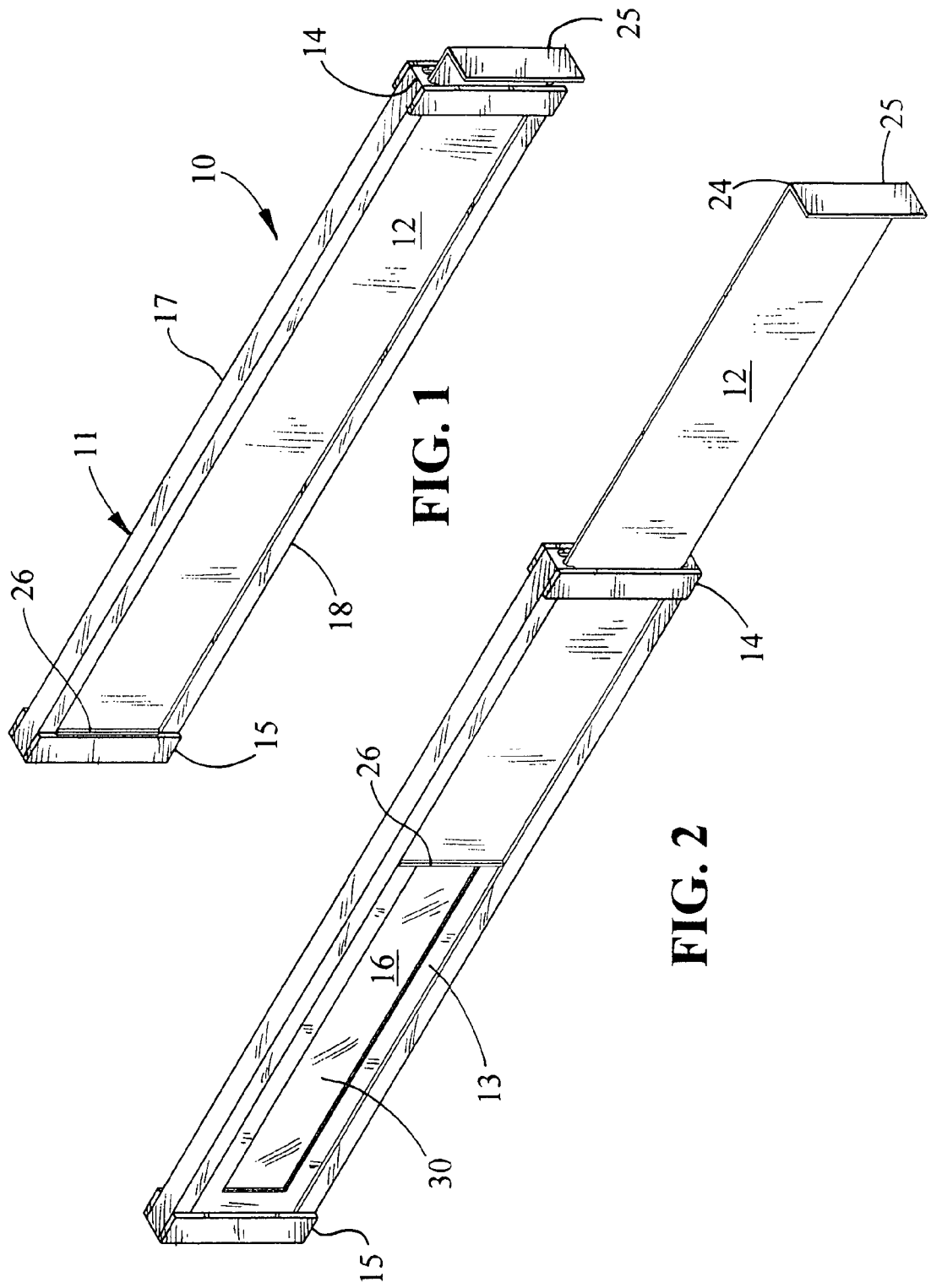

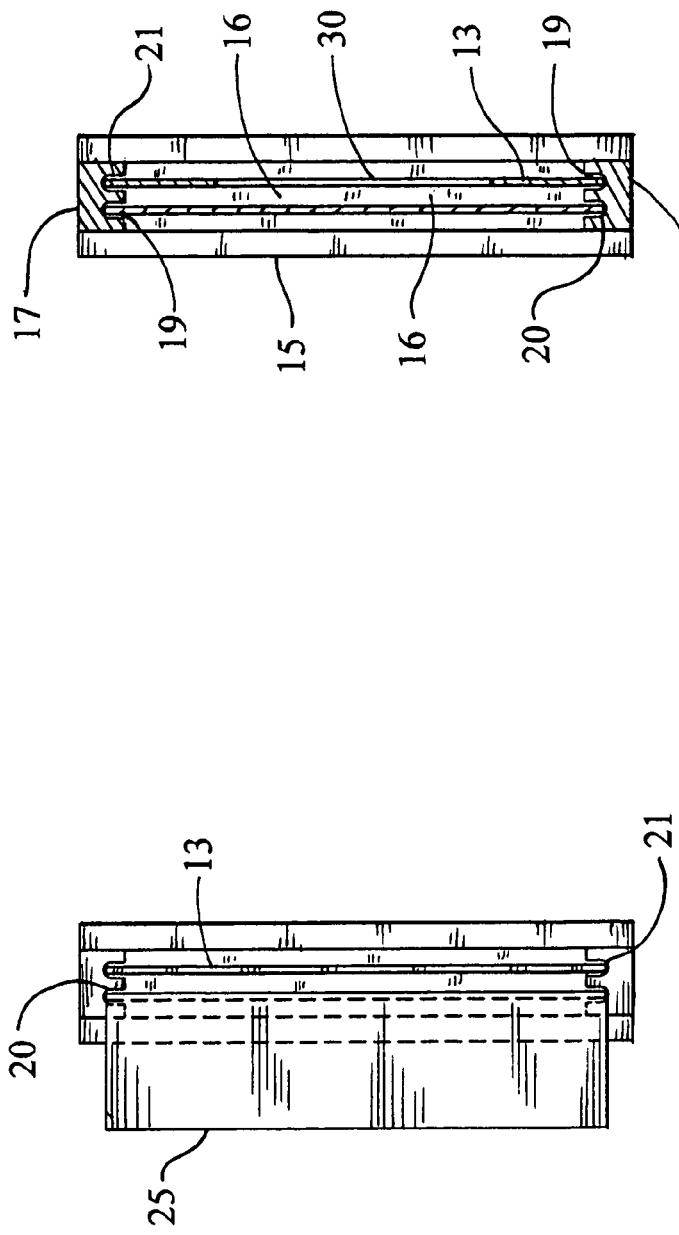
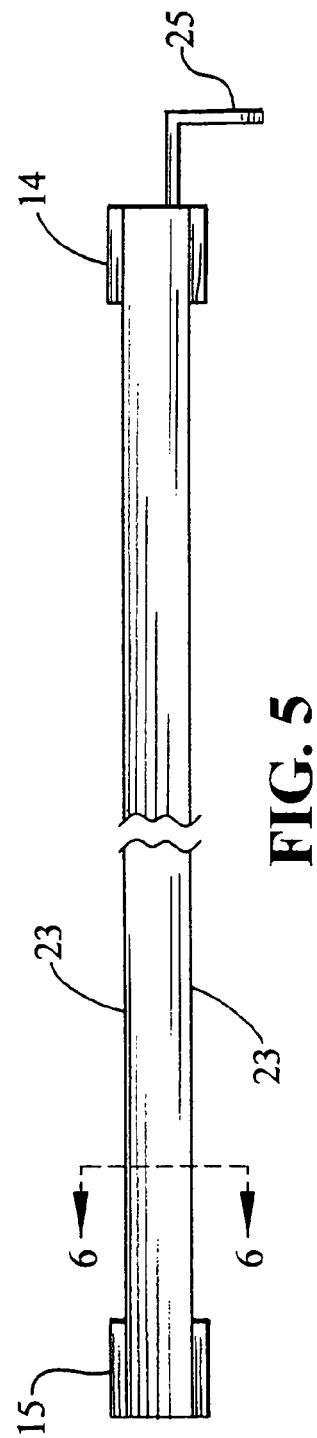

DEVICE FOR TEACHING READING SKILLS

BACKGROUND OF THE INVENTION

1. Field of the Invention

This invention relates to a teaching device, and more particularly concerns a device for teaching children to read.

2. Description of the Prior Art

Whether learning initially to read printed matter or attempting to overcome defined reading problems, there is a need for methodology that will enable a child to accomplish self-training without the constant presence of an instructor. Specific initial learning challenges or acquired problems include: misreading of words; tracking from line to line; skipping of words on lines; and losing place.

Devices have earlier been proposed which enable the child student to selectively isolate separate lines of print. Such devices usually involve a thin cardboard or plastic strip having an elongated aperture which is contoured to frame a line of print. The aperture may contain a transparent window component having a color that imparts beneficial effects. However, such earlier devices lack the versatility needed to cope with the various prevalent learning disabilities.

It is accordingly an object of the present invention to provide a reading learning device that can be operated by a reading student for self-teaching purposes.

It is another object of this invention to provide a device as in the foregoing object which has versatile functionality.

It is a further object of the present invention to provide a device of the aforesaid nature wherein said functionality is easily selected and adjusted by a child student.

It is a still further object of this invention to provide a device of the aforesaid nature which is of rugged construction and amenable to low cost manufacture.

It is yet another object of the present invention to provide a kit comprising a device of the aforesaid nature and interchangeable components interactive with said device.

These objects and other objects and advantages of the invention will be apparent from the following description.

SUMMARY OF THE INVENTION

The above and other beneficial objects and advantages are accomplished in accordance with the present invention by a reading teaching device comprising:
a) a substantially rigid frame of rectangular configuration elongated between opposed open and closed end members and having an open interior region defined by said end members and parallel upper and lower struts, each strut having two parallel grooves which open toward said interior region in facing opposition to constitute upper and lower track means,
b) an obscuring panel slidably secured within said interior region and bounded by forward and rearward ends and elongated upper and lower parallel edges positioned to slidably engage said upper track means, said forward end having abutment means to interact with the open end of said frame to prevent removal of said panel from said frame, and said rearward end having gripping means to facilitate manual movement of said panel to adjustable positions of entry into said interior region, and
c) at least one removable window panel dimensioned and configured to enter said interior region through said open end in sliding engagement with said track means and opposite said obscuring panel, said window panel having an elongated substantially rectangular aperture which centers within said interior region and has a height dimensioned to accommodate 1 to 3 lines of printed text, and a length, extending in the direction of elongation of 6 to 9 inches.

In preferred embodiments, the elongated aperture of said window panel may be covered by a thin transparent plastic film that may have a distinctive uniform coloration. In a further embodiment, several window panels having varied aperture heights and film colorations may be provided as components of a kit which additionally contains a frame and obscuring panel.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 1 is a top perspective view of an embodiment of a reading teaching device of the present invention shown in its closed, starting state of operation.

FIG. 2 is a view of the embodiment of FIG. 1 in a partially open, operational state.

FIG. 4 is an enlarged end view taken from the right side of FIG. 1.

FIG. 5 is an enlarged fragmentary top view of the embodiment of FIG. 1.

FIG. 6 is an enlarged sectional view taken in the direction of the arrows upon line 6-6 of FIG. 5.

DESCRIPTION OF THE PREFERRED EMBODIMENT

Figure 3:
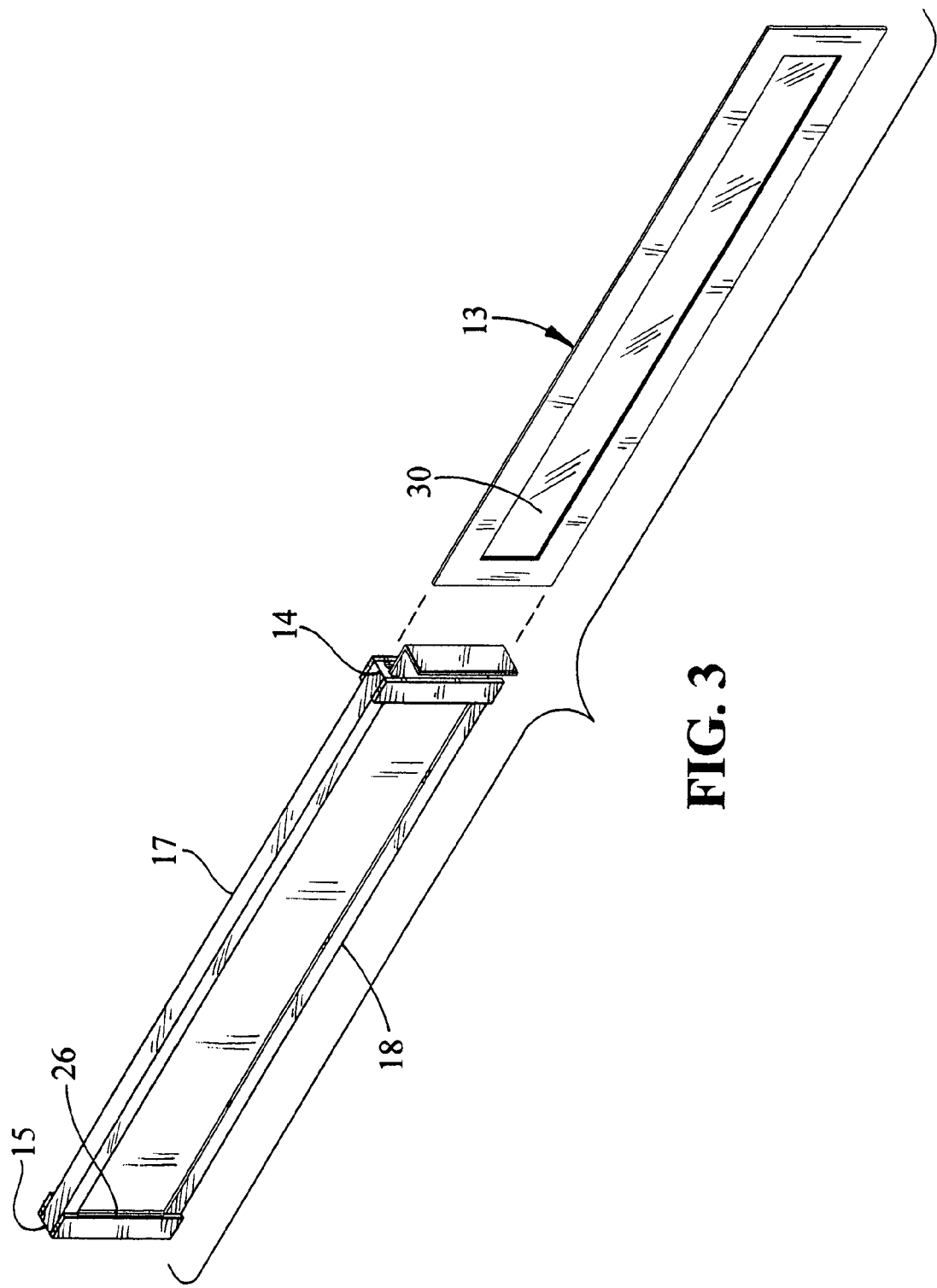
FIG. 3 is an exploded view of the embodiment of FIG. 1.

Referring now to FIGS. 1-6, an embodiment of the reading teaching device 10 of the present invention is shown comprised of frame 11, obscuring panel 12 and at least one removable window panel 13, said components being preferably fabricated of plastic materials.

Frame 11 is of substantially rigid construction, and of rectangular configuration elongated between open and closed end members 14 and 15, respectively. An open interior region 16 is defined by said end members and parallel upper and lower struts 17 and 18, respectively. Each strut has two parallel grooves 19 which open toward said interior region in facing opposition to constitute upper and lower track means 20 and 21, respectively. Said struts are preferably extruded forms which contain said grooves as portions of a monolithic structure. Frame 11 is further characterized in having flat opposing outer faces 23.

Obscuring panel 12 is a thin elongated strip of plastic material adapted to fit into and slide within upper track means 20. Said panel 12 extends between a proximal extremity 24 having gripping means in the form of upwardly directed tab 25, and a distal extremity having upwardly directed abutment means in the form of ridge 26 which interacts with open end member 14 to prevent removal of panel 12 from engagement with frame 11. In operation, the child or other student manually slides panel 12 to whatever extent desired within frame 11. In its fully inserted state, panel 12 completely occludes interior region 16.

Window panel 13 is fabricated of thin plastic material and configured to removably enter interior region 16 through open end 14 in sliding engagement with lower track means 21, and therefore beneath obscuring panel 12. Said window panel has an elongated, substantially rectangular aperture 30 which centers within said interior region 16. Aperture 30 has a height, measured orthogonally to the direction of elongation, which is large enough to accommodate one to three lines of conventional printed text, namely a height between about 7 and 15 millimeters. The length of said aperture, extending in the direction of elongation is between about 6 and 9 inches. Aperture 30 may be covered by a thin transparent plastic film that may have a distinctive uniform coloration. A yellowish color has generally been found preferable because it has been found to improve visual acuity of printed material.

In use, the student inserts an appropriate window panel 13, places the device flat upon the surface of the printed material, and slowly pulls obscuring panel 12 out of frame 11. Such action provides visualization of single or groups of words on a line of text, permitting focused concentration on the few words exposed to view. With practice, the student will acquire sufficient confidence to read more rapidly and with improved comprehension.

In another embodiment, the invention is provided as a kit containing said frame and obscuring panel, and a number of window panels having various aperture heights and transparent colored films.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A reading teaching kit comprising:
   a) a substantially rigid frame of rectangular configuration elongated between opposed open and closed end members and having an open interior region defined by said end members and parallel upper and lower struts, each strut being an extruded plastic form having two parallel grooves which open toward said interior region in facing opposition to constitute upper and lower track means,
   b) an obscuring panel comprised of a thin elongated strip of plastic material slidably secured within said interior region and bounded by forward and rearward ends and elongated upper and lower parallel edges positioned to slidably engage said upper track means, said forward end having abutment means to interact with the open end member of said frame to prevent removal of said panel from said frame, and said rearward end having gripping means to facilitate manual movement of said panel to adjustable positions of entry into said interior region, and
   c) several removable window panels of thin plastic material dimensioned and configured to enter said interior region through said open end member in sliding engagement with said lower track means, said window panels each having an elongated substantially rectangular aperture which centers within said interior region and having a height between 7 and 15 millimeters and a length of 6 to 9 inches.

2. The kit of claim 1 wherein said window panels have varied aperture heights.

3. The kit of claim 1 wherein said frame is bounded in part by opposing flat outer faces.

4. The kit of claim 2 wherein said window panels have transparent colored films.

5. The kit of claim 4 wherein said films have a yellowish coloration.

* * * * *